United States Patent [19]

Goulot et al.

[11] Patent Number: 4,657,453
[45] Date of Patent: Apr. 14, 1987

[54] MILLING DEVICE WITH UNIVERSAL GEAR AND AUTOMATIC INDEXATION

[75] Inventors: Etienne Goulot; Jean Kwapisz, both of Albert, France

[73] Assignee: Forest-Line, Paris, France

[21] Appl. No.: 649,498

[22] Filed: Sep. 11, 1984

[30] Foreign Application Priority Data

Sep. 15, 1983 [FR] France ............... 83 14700

[51] Int. Cl.$^4$ ............................................... B23C 1/12
[52] U.S. Cl. ................... 409/216; 409/211; 409/230
[58] Field of Search .............. 409/211, 215, 230, 201, 409/204, 207, 209, 210, 216; 908/35; 29/568

[56] References Cited

U.S. PATENT DOCUMENTS

| | | | |
|---|---|---|---|
| Re. 31,288 | 6/1983 | Matsuzaki et al. | 409/211 X |
| Re. 31,304 | 7/1983 | Tsukiji | 409/215 X |
| 1,976,107 | 10/1934 | Archea | 409/215 X |
| 2,307,222 | 1/1943 | Johnson | 409/215 |
| 2,685,122 | 8/1954 | Berthiez | 409/204 X |
| 3,023,677 | 3/1962 | Charlat | 409/230 X |
| 3,450,002 | 6/1969 | Shotter | 409/230 |
| 3,757,637 | 9/1973 | Eich et al. | 409/230 |
| 3,885,280 | 5/1975 | Berthiez | 408/35 X |
| 3,930,301 | 5/1975 | Wagner | 29/568 |
| 4,378,621 | 4/1983 | Babel | 409/216 X |
| 4,384,811 | 5/1983 | Eckstein et al. | 409/215 |
| 4,478,540 | 10/1984 | Sachot | 409/211 |
| 4,614,468 | 9/1986 | Waldrich et al. | 409/230 X |

FOREIGN PATENT DOCUMENTS

579871 11/1977 U.S.S.R. ............................. 409/211

*Primary Examiner*—Gil Weidenfeld
*Assistant Examiner*—Glenn L. Webb
*Attorney, Agent, or Firm*—Sachs & Sachs

[57] ABSTRACT

The invention relates to a milling device with universal gear and automatic indexation, removably mounted on a milling head bearing a machining spindle, comprising a main body mounted on the milling head and capable of occupying several positions of indexation with respect to said head by rotation about an axis $XX_1$ lying in line with the axis of the spindle of the milling head, said main body laterally bearing a spindle-holder unit capable of occupying several positions of indexation with respect to the main body by rotation about an axis $YY_1$ perpendicular to axis $XX_1$, the spindle of the unit itself being perpendicular to axis $YY_1$, wherein the spindle of the milling head is connected to the spindle of the spindle-holder unit by a kinematic chain comprising a shaft or sleeve disposed along axis $YY_1$ and on which is mounted a gear which is in mesh with a ring gear fast with the spindle-holder unit during the operation of indexation and which is not of mesh with said ring during the work operation.

2 Claims, 3 Drawing Figures

MILLING DEVICE WITH UNIVERSAL GEAR AND AUTOMATIC INDEXATION

The present invention relates to a milling device incorporating universal gear and automatic indexation.

Heretofore known milling devices allow machining of flat surfaces of a workpiece along the three planes XOY, YOZ and XOZ and, to vary the angular values of the different planes with respect to these three reference planes, it is necessary to employ particular artifices such as special assemblies, an inclined sole, etc.

This process involves dismantling of the workpiece, a fresh adjustment of the positions required and intermediate idle times, resulting in a loss of productivity.

French Pat. No. 572 650 discloses a milling machine head in which a main body is mounted on the milling head and capable of occupying several positions of indexation with respect to said head by rotation about an axis $XX_1$ lying in line with the axis of the spindle of the milling head, said main body laterally bearing a spindle-holder unit capable of occupying several positions of indexation with respect to the main body by rotation about an axis $YY_1$ perpendicular to axis $XX_1$, the spindle of the unit itself being perpendicular to axis $YY_1$.

However, in this device, the spindle-holder unit must be displaced manually and fixed in position by means of bolts, this involving a long and imprecise adjustment.

In accordance with the present invention, the spindle of the milling head is connected to the spindle of the spindle-holder unit by a kinematic chain comprising a shaft or sleeve disposed along axis $YY_1$ and on which is mounted a gear which is in mesh with a ring gear fast with the spindle-holder unit during the operation of indexation and which is out of mesh with said ring during the work operation.

This device makes it possible to position a workpiece on a machine table without having to use the artifices mentioned above to vary the angular values of the different planes with respect to the three reference planes, this consequently leading to a gain in productivity by avoiding dismantling of the workpiece, by obtaining a virtually instantaneous adjustment of the positions required and consequently a reduction in the intermediate idle times.

In addition, the rotation of the spindle-holder unit and the pivoting movement of either part of the milling head can be achieved with the same driving member.

The invention will be more readily understood on reading the following description with reference to the accompanying drawings, in which.

Figure 1:
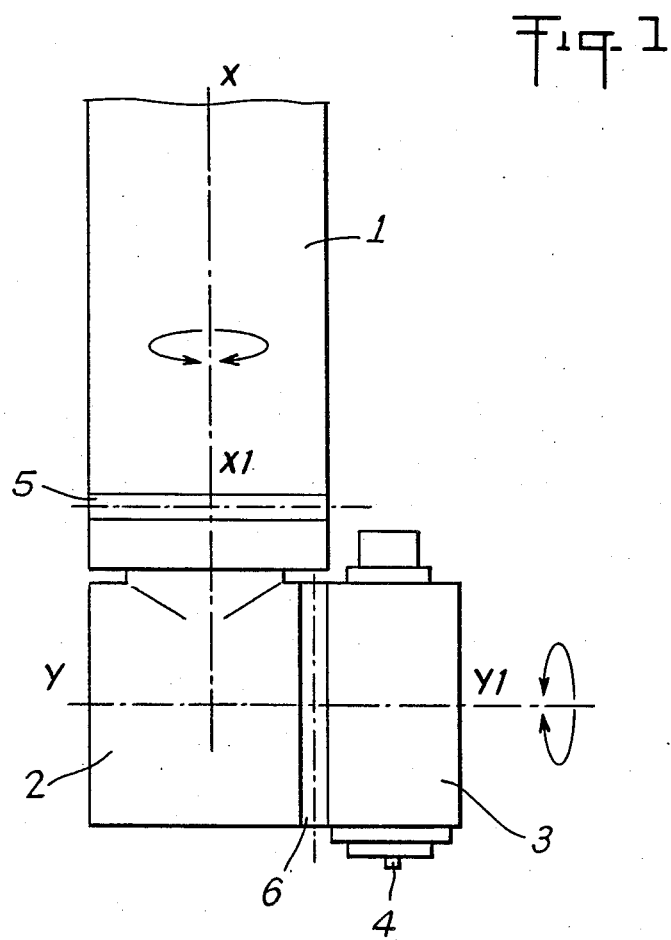
FIG. 1 is a view in elevation of the milling device with universal gear according to the present invention.

Referring now to the drawings, FIG. 1 shows a milling head 1 with vertical spindle on which is rotatably mounted, along a vertical axis $XX_1$, a main body 2 of the universal gear which bears a spindle-holder unit 3 capable of pivoting with respect to the body 2 along a horizontal axis $YY_1$ perpendicular to axis $XX_1$.

The unit 3 is provided with a spindle 4 adapted to bear a tool and whose axis is perpendicular to axis $YY_1$.

The milling head and the main body are locked and indexed one with respect to the other by a set 5 of two notched rings of which one is mounted on the milling head 1 and the other is mounted on the main body 2.

The means for connection and the means for indexation of the main body 2 on the milling head 1 are those described in Applicants' European Pat. No. 0 074 452

Figure 3:
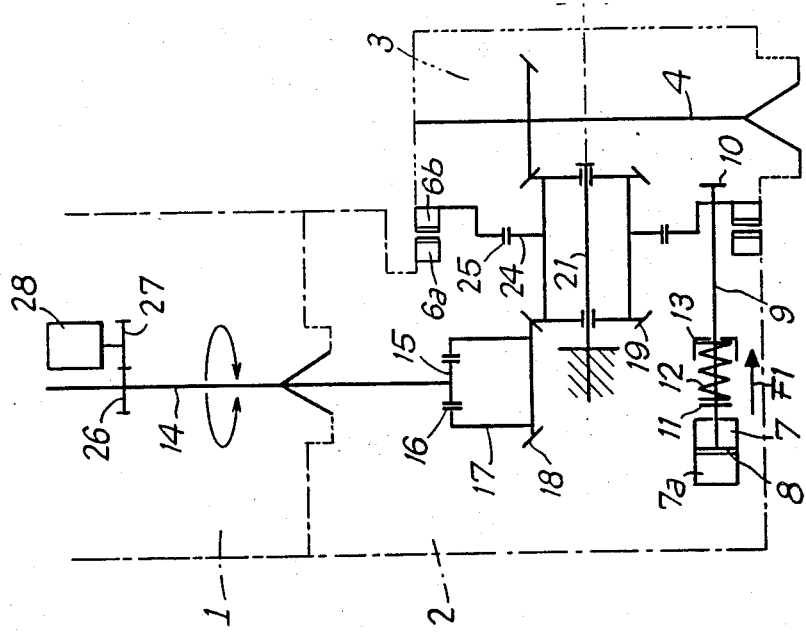
FIG. 3 is the same view of the device showing the kinematic chain in position of indexation of the spindle-holder unit.
Figure 2:
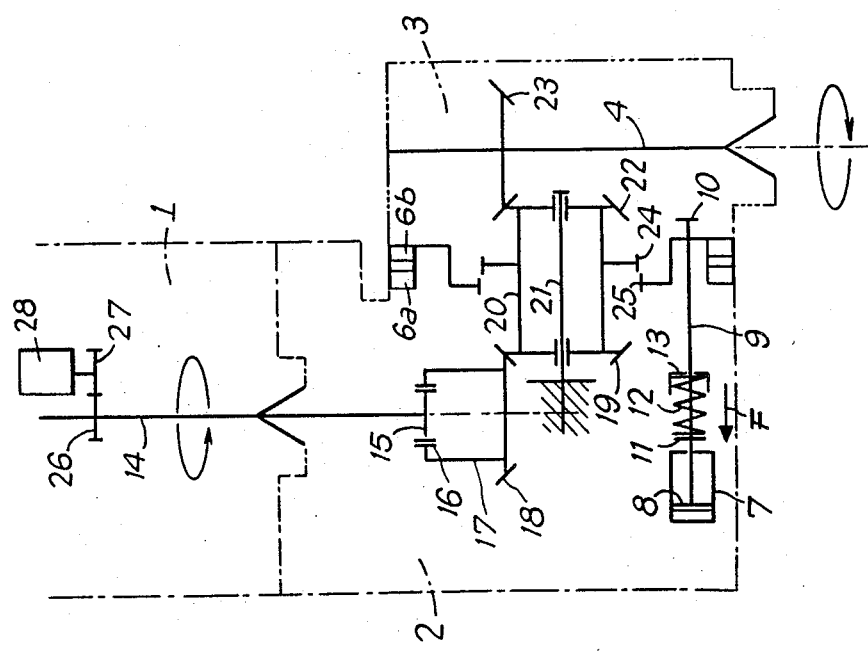
FIG. 2 is a view in elevation of the device showing the kinematic chain for driving the spindle in work position.

Similarly, the body 2 and the spindle-holder unit 3 are locked and indexed by a set 6 of two notched rings of which one, 6a, is mounted on the body and the other, 6b, on the spindle-holder unit 3 (FIGS. 2 and 3).

In the main body 2 are mounted hydraulically controlled jacks 7 of which only one has been shown in FIGS. 2, 3, said jack comprising a piston 8 which is connected by a rod 9 to the spindle-holder unit 3 on which it is mounted at 10. Said rod 9 bears a stop 11 which is subjected on one side to the action of a stack of elastic washers 12 in abutment on the other side against a stop 13 fast with the body 2, said elastic washers tending to maintain the piston 8 towards the left in the direction of arrow F in the work position (FIG. 2) for which the notched rings 6a, 6b are in mesh immobilizing the unit 3 with respect to body 1 in a determined position of indexation.

When a hydraulic fluid is admitted in the chamber 7a of the jack, the piston 8 is pushed towards the right by compressing the elastic washers 12 and by displacing the rod 9 in the direction of arrow F1, so that the notched rings 6a, 6b are out of mesh for an operation of indexation of the spindle-holder unit 3 allowing the rotation of the unit 3 about axis $YY_1$.

The kinematic chain concerning the spindle 14 of the milling head to the spindle 4 of the spindle-holder unit is constituted by a gear 15 which meshes with the ring 16 fast with a tubular member 17 mounted to rotate in the body 2 and bearing a conical gear wheel 18 meshing with a conical gear wheel 19 fast with a sleeve 20 mounted to rotate freely on a shaft 21 of which one of the ends is fixed in the body 2.

At one of its ends, opposite gear wheel 19, the sleeve 20 bears another conical gear wheel 22 which meshes with a conical gear wheel 23 fast with the spindle 4.

In its median part, the sleeve 20 bears a gear 24 adapted to mesh with a ring 25 fast with the spindle-holder unit when the latter is displaced in position of indexation as shown in FIG. 3 to drive the spindle-holder unit 3 in rotation.

On the spindle 14 is mounted a gear 26 which meshes with a gear 27 fast with the drive shaft of a member 28 for measuring the angular position of the spindle-holder unit.

When the body 2 is connected to the milling head 1 by the device forming the subject matter of European Pat. No. 0 074 452, a quill (not shown in the drawings) of the milling head may move downwardly in the body of the latter by several millimeters, thus releasing the two rings 5 until they are entirely disengaged.

The motorized rotation of this quill then allows rotation of the body 2 and of the unit 3 with respect to the milling head about axis $XX_1$ through a predetermined angle.

The angular position of the body 2 is measured by a reading device mechanically connected to the quill of the milling head and which controls rotation of said quill. As soon as the position is reached and detected, the rise of the quill and of the body 2 allows the notched rings 5 to mesh. The body 2 and the spindle-holder unit are thus positioned angularly with respect to axis $XX_1$.

The same operation is then carried out about axis $YY_1$ and, to this end, the jacks 7 are actuated, with fluid admission into chamber 7a, which pushes the pistons 8 and the rods 9 in the direction of arrow Fl, so that, in a first stage, the elastic washers 12 are compressed, then releasing the spindle-holder unit 3 and, in a second stage, the rods 9 move the two notched rings 6a, 6b away from each other, which thus allow rotation of the unit 3 about the axis $YY_1$ with respect to body 2.

Finally, there is abutment of the unit 3 and mesh of the ring 25 with gear 24. In this position, shown in FIG. 3, the spindle 4 is actuated, its rotation being transmitted by the kinematic chain 15, 16, 17, 18, 19, 20 and 24 to the ring 25 and to the spindle-holder unit 3 which rotates about the axis $YY_1$ to reach a predetermined angular position.

The mesh ratios being 1/1 in the transmission, the angular value which is given to the new position of the unit 3 is controlled via the measuring member 28.

The angular positions of the body along $XX_1$ and of the spindle-holder unit 3 along $YY_1$ being attained, the work position is resumed by connecting jack 7 to the spindle so that the elastic washers 12 drive the rods 9 in the direction of arrow F provoking disengagement of the gear 24 and of the ring gear 25 and then mesh of the notched rings 6a, 6b thus fixing the spindle-holder unit in an angular position of indexation.

The device thus being in work position as shown in FIG. 2, rotation of the spindle 4 is transmitted by the kinematic chain 15, 16, 17, 18, 19, 20, 22 and 23 to the spindle 14 which bears the machining tool.

This device according to the invention may be mounted on a milling head either by manual presentation from a carriage or by automatic presentation from a transfer or a mechanized and controlled device.

The invention is, of course, not limitative and the man skilled in the art may make modifications thereto without departing from the scope of the invention.

What is claimed is:

1. A milling device with universal gear and automatic indexation, removably mounted on a milling head bearing a machining spindle, comprising a main body mounted on the milling head and capable of occupying several positions of indexation with respect to said head by rotation about on axis $XX_1$ lying in line with the axis of the spindle of the milling head, said main body laterally bearing a spindle-holder unit capable of occupying several positions of indexation with respect to the main body by rotation about an axis $YY_1$ perpendicular to axis $XX_1$, the spindle of the spindle-holder unit itself being perpendicular to axis $YY_1$, wherein the spindle of the milling head is connected to the spindle of the spindle-holder unit by a kinematic chain comprising a shaft or sleeve disposed along axis $YY_1$, said shaft or sleeve achieving rotation and indexing of the spindle of the spindle-holder unit, and on which is mounted a gear which is in mesh with a ring gear fast with the spindle-holder unit during the operation of indexation and which is out of mesh with said ring during the work operation, and wherein the body and the spindle-holder unit comprise ring gears which are maintained in mesh in work position and out of mesh for indexation of the unit by jacks acting to separate the spindle-holder unit from the main body or to approach them one to another by translation in the direction of the axis $YY_1$.

2. The device of claim 1, wherein there is mounted on the spindle of the milling head a measuring member indicating the angular position of the spindle-holder unit.

* * * * *